March 31, 1936.   H. A. JAHRAUS   2,035,654
AIR COOLING APPARATUS
Filed Jan. 30, 1933

INVENTOR
HAROLD A. JAHRAUS.
BY
Toulmin & Toulmin
ATTORNEYS

Patented Mar. 31, 1936

2,035,654

UNITED STATES PATENT OFFICE

2,035,654

AIR COOLING APPARATUS

Harold A. Jahraus, Richmond, Ind., assignor to Mutual Air Systems, Inc., Indianapolis, Ind., a corporation of Indiana Application January 30, 1933, Serial No. 654,198

3 Claims. (Cl. 62—139)

My invention relates to air conditioning and particularly to a method and apparatus therefor.

It is the object of my invention to provide an apparatus and method by which I use the forced evaporation of the liquid and the drop in temperature of air and liquid due to the release of latent heat by evaporation for cooling the air circulated in the enclosure or delivered to the enclosure.

My invention relates to a method of producing a substantial drop in temperature between the substance cooled and the existing natural temperature of the same substance.

It is my object to provide a method by which the liquid is atomized and at the same time is agitated with a large quantity of air in contact with a large amount of liquid thus atomized so that the water so evaporated will take up the heat from the air and also take up heat from the surplus water which lowers the temperature of the existing saturated air to a corresponding extent; and thereafter the excess water of cooler temperature is drained from the mixture of air and water and used for cooling purposes in a suitable heat exchanger while the air which has thus been scrubbed with excess moisture can be utilized for additional temperature changing operations.

In particular it is my object to provide a method by which heat is removed from air by passing the air through water sprays, the heat is taken up by the air from the water, the free water is scrubbed from the air and the free water thus cooled is used for cooling another body of air.

Figure 1:
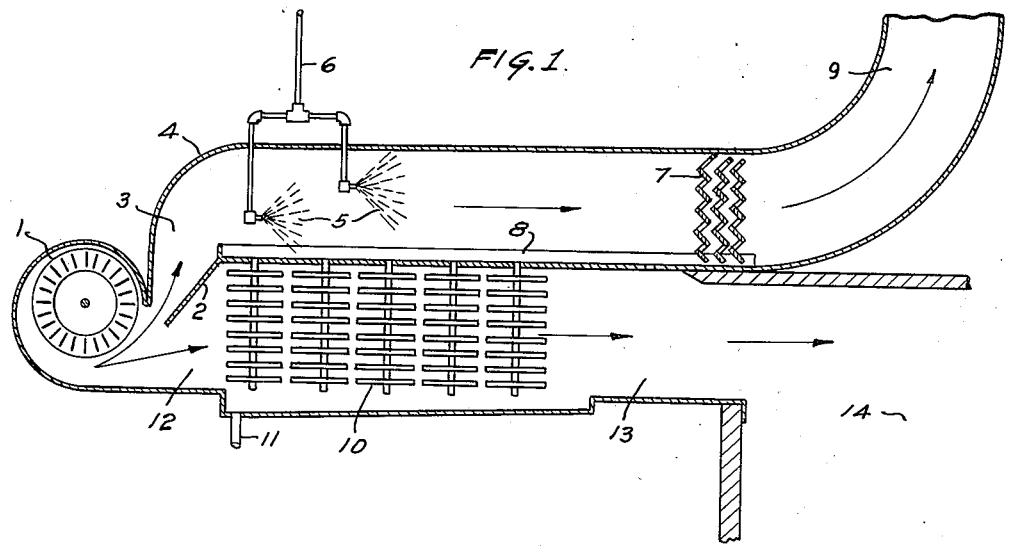

Referring to the drawing, Figure 1 illustrates a preferred form of my apparatus which is shown diagrammatically in section.

Figure 2:
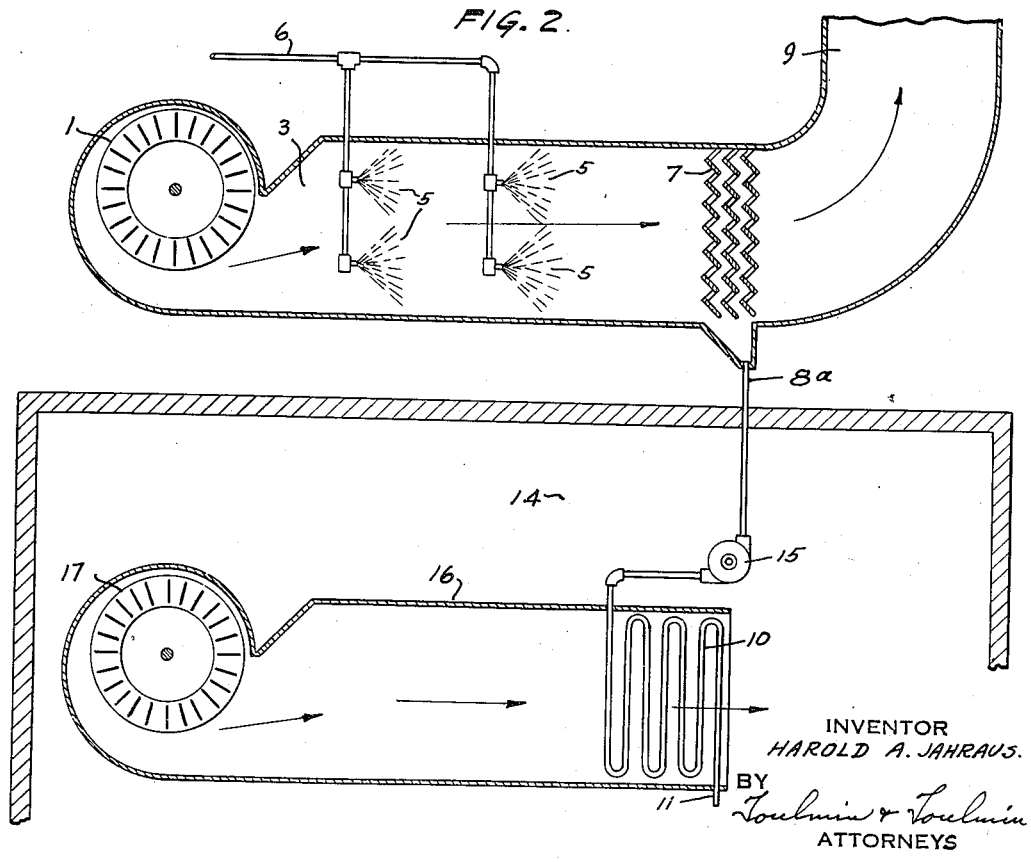

Figure 2 is a similar view showing another form of the apparatus for the practice of my method.

Referring to the drawing in detail, I provide a fan 1 into which outside fresh air is introduced. This air is divided into two streams by the partition 2. One stream passes through the passageway 3 formed by the casing 4 where it passes through a plurality of water sprays 5. The water so supplied through the pipe 6 may range from zero up to 100 degrees. The usual temperature of water from natural sources ranges from 50 degrees to 65 degrees or even 70 degrees, and is suitable for all the usual purposes.

It will be understood that the temperature of the water may be artificially controlled, if desired. The large surface of the water thus provided by the fine atomization of the water is engaged by the air passing therethrough under the influence of the fan. As the rate of evaporation of the liquid depends in part on the amount of surface exposed to evaporation, the forced draft of air through the fine spray provides the maximum contact of the air with a large surface of liquid. As each pound of water so evaporated takes up 970 B. t. u., the resulting mixture of nearly saturated air and excess water has its temperature lowered to a corresponding extent. The free water which has thus had its heat extracted from it by this evaporation is passed through a scrubber 7 where the cooled free water is scrubbed from the air and passes down into the trough 8 while the waste air passes through the passageway 9 where it may be used again if desired to be passed through a radiator before being exhausted. The cooled water in the trough 8 descends by gravity through the radiator 10 and thence out through the drain 11.

The fan 1 forces the other stream of air into the passageway, over the radiator 10 and out at the passageway 13 into an inclosure 14 to be cooled by the conditioned air.

Turning to Figure 2, it will be noted that by this arrangement the fan 1 delivers a single body of air through the passageway 3 over the sprays 5. The free cool water is scrubbed by the scrubber 7, from which it descends by gravity through the pipe 8a to the pump 15, which pumps it through the radiator 10 and thence to the drain through the pipe 11.

In this instance, a casing 16 is provided for the radiator 10 and a fan 17 located in the room so that air in the room 14 may be recirculated through the fan 17, casing 16, over the radiator 10 for redelivery to the room as cooled air.

This cooling may be effected by the radiator 10 or by both the radiator and water sprays, both supplied with cool water from the pipes.

It will be understood that when I refer to air, I refer to any gas; when I refer to liquid, I refer to any liquid, and when I refer to an enclosure, I refer to any type of room.

It will be understood that I desire to comprehend within my invention such modifications as may be clearly embraced within the scope of my claims and invention.

Having thus fully described my invention, what I claim as new and desire to secure by Letters Patent, is:

1. In combination, a fan, a casing having a partition therein forming two passageways for dividing the air from the fan into two streams, means for introducing water in the form of a spray from an outside source in the direction of the flowing air in one side of the casing in one passageway, a scrubber on that side of the casing, a radiator in the other passageway means communicating from the scrubber to the radiator, means for conveying the air from the radiator to an enclosure, and means for conveying the air from the scrubber away from the enclosure.

2. In an apparatus for conditioning air, the combination of a fan, a longitudinally divided casing forming two passageways for dividing the air into two streams, means for introducing a fine spray of water in one of said passageways in the direction of flow of the stream of flowing air, means for separating the unevaporated particles of water from the stream of air in said passageway, a radiator in the other air passageway, means for conducting said separated particles of water to said radiator, and means for conveying air from the passageway containing said radiator to an enclosure.

3. In an apparatus for conditioning air, the combination of a fan, a casing communicating with said fan and divided longitudinally by a partition forming two passageways therein for dividing the air into two separate streams, means for introducing a fine spray of water in one of said passageways in the direction of air flow therein, a scrubber in said passageway, a radiator in the other passageway, means for conducting cooled separated water from the first named passageway into said radiator, and means for conveying air from the passageway in which the radiator is located to an enclosure.

HAROLD A. JAHRAUS.